(12) United States Patent
DeVolpi

(10) Patent No.: US 6,384,717 B1
(45) Date of Patent: May 7, 2002

(54) BICYCLE RENTAL AND SECURITY SYSTEM

(76) Inventor: Dean R. DeVolpi, 806 Buchanan Blvd. #115-233, Boulder City, NV (US) 89005

( * ) Notice: Subject to any disclaimer, the term of this patent is extended or adjusted under 35 U.S.C. 154(b) by 0 days.

(21) Appl. No.: 09/884,267

(22) Filed: Jun. 19, 2001

Related U.S. Application Data

(63) Continuation-in-part of application No. 09/170,841, filed on Oct. 13, 1998, now abandoned.
(60) Provisional application No. 60/061,997, filed on Oct. 14, 1997.

(51) Int. Cl.$^7$ .................................................. B62J 3/00
(52) U.S. Cl. ..................... 340/432; 340/427; 340/568.1; 194/205; 194/247; 194/902
(58) Field of Search ................................. 340/432, 427, 340/543, 568.1, 932.2; 194/205, 248, 902; 235/381, 382

(56) References Cited

U.S. PATENT DOCUMENTS 5,841,351 A * 11/1998 Rey ........................... 340/432
5,917,407 A *  6/1999 Squire et al. ............... 340/432

* cited by examiner

*Primary Examiner*—Daniel J. Wu
*Assistant Examiner*—Sihong Huang

(57) ABSTRACT

An unattended bicycle rental and security system, utilizing bi-directional communications with data verification between the individual bicycles and the system is provided which is equipped with an alarm, and can individually identify a number of bicycles and attribute their rental with corresponding customers. The unattended bicycle rental and security system is able to identify if a rental bicycle has sustained an impact during a rental that is sufficient to damage it and identify the customer whose care the rental bicycle was in at the time. The system also allows the integration of several rental locations allowing a bicycle to be rented at one location and returned at another.

14 Claims, 3 Drawing Sheets

BICYCLE RENTAL AND SECURITY SYSTEM

CROSS REFERENCE TO RELATED APPLICATIONS

This application is a CIP of U.S. patent application Ser. No. 09/170,841 filed Oct. 13, 1998, now abandoned, entitled Bicycle Rental and Security System and claims benefit of U.S. provisional patent application Ser. No. 60/061,997 filed Oct. 14, 1997 entitled Self Service Sales and Rental Security System, which applications are incorporated herein by reference.

FIELD OF THE INVENTION

The present invention relates generally to methods and procedures utilized to monitor use of rental items and identify damage to the rental items by customers, and to methods to prevent theft of the rental items, and, more particularly, to a self service system and procedure, incorporating bi-directional communications, to automatically monitor use of and damage to individually identifiable rental items including bicycles and other recreational articles, and correlate such use or damage to a particular customer. And further, where the self-service system and procedure is able to secure the rental items from theft, yet is convenient to use.

BACKGROUND OF THE INVENTION

Operation of a service for the rental of recreational articles such as bicycles, sailboats and powered watercraft is labor intensive often limiting the rental activities to the hours of operation of the rental service when an employee is able to monitor the rental articles and attend to the process of renting articles and receiving return of the rental articles.

In a typical operation for rental of recreational articles, the unrented rental articles are secured by mechanical locks, are kept within the rental shop, or otherwise require an attendant to constantly watch the articles during hours of operation when the articles are not secured, to prevent theft. An attendant is further required to unlock or allow access to the rental articles for customers, calculate and collect fees for the rental of the recreational articles, and to inspect the rental articles for damage sustained during the period of rental. Additionally, an attendant is necessary to record the identity of the customer renting a particular rental article and to receive credit or debit card information, cash, or other like deposit, for use in the event the rental article is damaged or not returned by the customer. Further, a typical operation for rental of recreational articles does not lend itself to the convenience of customers, as an attendant is required to process rentals and returns thereby limiting customers' ability to rent articles to the hours such operation is open, and since such operations are often limited to a single location where articles are rented and returned, customers are not able to rent an articles at one location and return it at another location for customer convenience or commuting purposes.

Attempts have been made to automate the rental and security of bicycles and other recreational articles. Two examples of attempts to automate the rental and security of rental bicycles are described in U.S. Pat. No. 5,841,351 to Rey, and U.S. Pat. No. 5,917,407 to Squire et al. In both the Rey and Squire devices, an identifier is attached to the rental bicycle which is read by the rental and security system to identify the rental bicycle. In the Squire et al. device a bar code is attached in some fashion to the bicycle and is read by a bar code reader upon return of the bicycle; in the Rey device an integrated circuit is attached in some fashion to the bicycle and is read by the system upon return of the bicycle. Although the Rey device also teaches the use of a further portable key with identification information that can be read, both the Rey and Squire devices suffer from the one way communication method through which the bicycle identification information is read.

Under less than ideal conditions, one way communication methods cannot insure that the data intended to be read is in fact properly read; communication noise can affect various means of data communication including direct electrical contact, optical transmission and radio frequency transmission. Where rental articles such as bicycles, may be returned in a dirty condition or within less than ideal environmental conditions, communication noise encountered with one way communication methods of the bicycle identification information becomes a significantly limiting factor with unattended bicycle rental and security systems. The occurrence of communication noise in direct electrical, radio frequency, and optical communications, is well known. Where one way communications methods are employed, data verification through handshaking and error correction schemes cannot be utilized to combat such communication noise, and failure of correct data communication results.

Although certainly not the only instance, one readily appreciated example of communication failure encountered in a one way communication method involves the bar code scanners that are frequently employed in grocery stores; where the bar code is frosted, dirty or bent, the scanner does not recognize that the item is present and the scan must be attempted repeatedly by an operator until the item is recognized.

Accordingly, it is the object of the present invention to provide an improved system to facilitate the rental of bicycles and other recreational articles in which, the rental articles can be individually recognized by an automated system utilizing a bi-directional communications method that employs data verification through handshaking and error correction, the rental articles are secured from theft, yet can be rented regardless of whether an attendant is present, possible damage to the rental articles can be identified and associated to an identifiable customer, and a number of separate automated locations are provided which are in communication with one another so that rental and return need not occur at the same location.

SUMMARY OF THE INVENTION

The objects of the present invention are accomplished by the bicycle rental and security system which comprises: a number of rental articles which have individual article identification means and mechanical shock sensors incorporated within a semiconductor circuit which is programmed with information which uniquely identifies the rental article to which it is attached; one or more kiosks containing security racks, with alarm sensors, to releasably secure the rental items from theft and tampering; a control center at each kiosk, which can communicate, in a bi-directional fashion with the semi conductor circuit of the individual article identification means and shock sensors of each rental article secured to the security rack, and can perceive the alarm sensors of the security rack, and can provide a signal to the security rack to selectably release and secure individual rental items; and a system processor to receive information from and send information to the one or more control centers.

The control center has means for input of customer and payment information for a customer seeking to rent a particular rental article. The control center's means for input of customer and payment information may be accomplished through use of a keypad or touch screen utilizing individual codes or by insertion of a card encoded with customer and payment information, such as a credit or debit card or pre-paid rental card, into a card reader incorporated into the control center.

The system controller receives information from the control centers, indicating which rental articles are unrented and in bi-directional communication with the control center, which rental articles are being rented and removed from the security rack and by what customers, and indicating which rental articles are being returned and secured to the security racks and whether a returned rental articles shock sensor indicates an impact during the rental period. The system controller maintains a permanent record of the rental articles including rental time, return time, shock sensor activation, location and customer history upon a disk drive, EEPROM or similar recording device.

Upon entry of a pass code or insertion of a card into a card reader of a control center, the system controller receives customer and payment information for a customer seeking to rent a particular rental article. A permanent record for each customer is maintained by the system controller which record could indicate, a determined rental credit authorization for the customer, which rental articles are currently in the individuals possession, and a prior rental history for the individual, including times and dates and identifying the particular articles rented, returned and damaged. By evaluating the record for a customer, the system controller directs the control center, either authorizing or denying release of a particular rental article from the security rack and updating the record for the customer upon release of a rental article from the security rack.

In the event that the system controller receives information from a control center that an alarm sensor has been activated, or that there has been an unanticipated loss of bi-directional communication with the semiconductor circuit of a rental item, the system controller would record the time, date, location and rental article information and can be directed to automatically sound an alarm, contact security or contact law enforcement by radio, telephone or other accepted transmission method and relay the recorded information.

In the event that the system controller receives information from a control center that a mechanical shock sensor has been activated on a newly returned rental article the system controller could be directed to automatically contact maintenance personnel to inspect the rental article for damage and to secure the rental article from further rental until it has been inspected.

In addition to securing rental articles from theft, the security rack and control center may be configured to simultaneously allow customer owned articles to be secured from theft by the security racks and alarm sensors of the control center and accept customer and payment information for such service.

As a further option of the invention, the bicycle rental and security system can be configured so that a rental bicycle can be reserved by a customer, from a control center, for rental at a particular kiosk location for a future time to insure that a rental bicycle will be available at that time. In the event of such a reservation, the system controller would direct the control center at the particular kiosk location, not to release a particular rental bicycle, except to the customer with the reservation for a given period of time. Since the system controller can be connected to telephone and internet communications, the reservation process of the bicycle rental and security system could be extended to include reservations made by telephone and internet, where a customer is given an automated menu of rental choices and is given the ability to make selections and provide customer and payment information over the telephone or internet.

In practice of the current invention, an article identification means and mechanical shock sensor are incorporated within a semiconductor circuit which is attached to a rental article, the rental article is in turn secured to a security rack of a kiosk whereby bi-directional communication is established between the control center and the semiconductor circuit, thus indicating the identification of the rental article, the status of the shock sensor and the rental article's location. At the same time alarm sensors, if present at the location of the rental item on the security rack, are enabled.

The article identification means and mechanical shock sensor are incorporated within a semiconductor circuit which is programmed with information which uniquely identifies the rental article to which it is attached, and programmed with the protocol for bi-directional communication with the control center. When the rental article is placed within the rack, the circuit incorporating the article identification means and mechanical shock sensor establishes bi-directional communication with the control center. The method of bi-directional communication may be through any viable communication method including direct electrical contact, radio frequency, or optical communication. With the bi-directional communication, data verification through handshaking and error correction is utilized. The verification or error checking protocol employed may be of any suitable protocol including redundant talkback and checksum and data.

In the bi-directional protocol of one present embodiment of the invention, upon placement of a rental article within a rack, the control center begins communication with the semi-conductor circuit of the rental article, the semi conductor circuit of the rental article in turn communicates to the control center that it is present, at which time the control center requests the unique article identification information and shock sensor status of the semi conductor circuit of the rental article. When article identification information and shock sensor status is sent to the control center the article identification information and shock sensor status is repeated back to the semi-conductor circuit of the rental article, which may be in encrypted form, for a secondary confirmation. The successful communication confirms the rental article is present, otherwise the control center starts the protocol a new until confirmed communication is established. Further, the error correction routine may slow down transmission speed or change the protocol until successful communication is established.

With the bi-directional communication between the control center and the semi conductor circuit of the rental article, the system controller is able to repeatedly request information and status from the semiconductor circuit of the rental article thereby serving the further function of an active rather than a passive alarm. The communication between the control center and the semi conductor circuit preferably incorporates a changing encryption system to increase security of communications and prevent fraudulent code catching and duplication.

Customers utilize a pass code, credit card, debit card or customer card supplied by the rental operator to input their customer and payment information into the control center. A rental article may be released from a security rack only after customer and payment information is input at a control center, transmitted to the system controller and authorization for release of the rental article is received by the control center from the system controller. In instances where a pass code or customer card are supplied by the rental operator, a customer can be required to provide a security deposit or detailed personal information to insure that rental payments or damages to rental items can be collected. In instances where a credit card or debit card is utilized, the system controller can communicate with financial institutions, for verification of credit or balance information, to authorize release of a rental article and bill rental and damage charges for the rental article directly to the credit or debit card account.

When a rental article is released to a customer, the system controller records the time, date, location, identity of the rental article, along with customer and payment information Similarly, when a rental article is returned, the time, date, location of return, identity of the rental article, and status of the mechanical shock sensor are recorded by the system controller. Through use of the information recorded by the system controller, a customer can be automatically charged for the time period in which the customer used the rental article, which charge could be adjusted to take into account whether the customer returned the article to the same location or commuted to a different location. Additionally, the information recorded can be used to automatically identify possible damage to a rental article, making it unfit for further rental until inspected and serviced, and attributing any damage to a particular customer. And the information recorded can be utilized to automatically indicate the need to move rental articles from one kiosk to another to accommodate customer demand.

Since each rental article has individual identification means, in the event that a rental article is not returned in a given period, the customer who rented the item is identified by records of the system controller and their deposit or account can be charged or the customer billed for the rental article.

Although the present invention has been described with a control center at each kiosk that is in communication with a single system controller, which is the preferred embodiment to allow for commuting from one kiosk to another, it must be recognized that the functions of the system controller and a control center may be combined within a single device.

Other objects, advantages and novel features of the present invention will become apparent from the following drawings and detailed description of the preferred embodiments.

DESCRIPTION OF THE PREFERRED EMBODIMENTS

Figure 1:
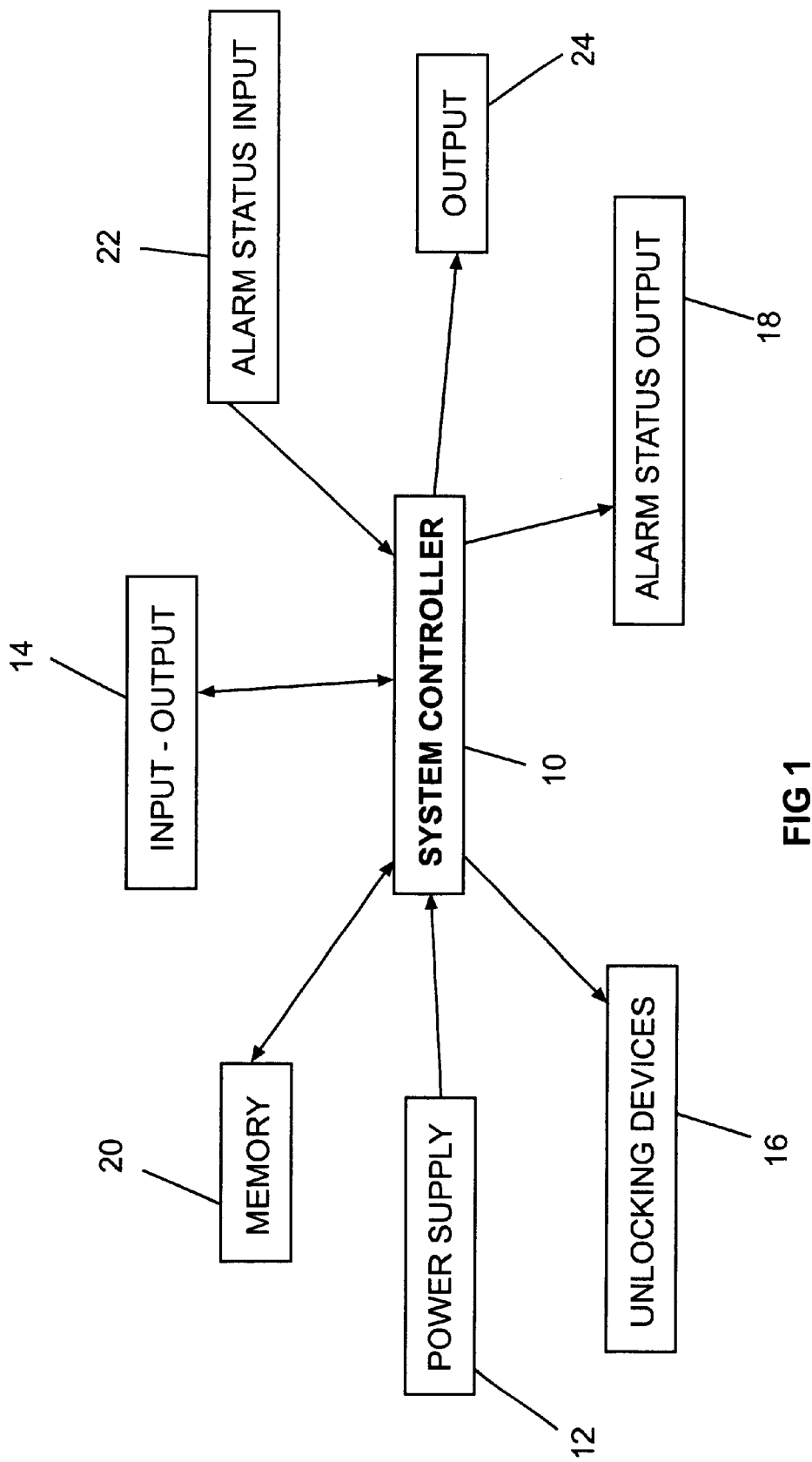
FIG. 1 is a block diagram illustrating the functional connections of the system controller of the present invention.
Figure 2:
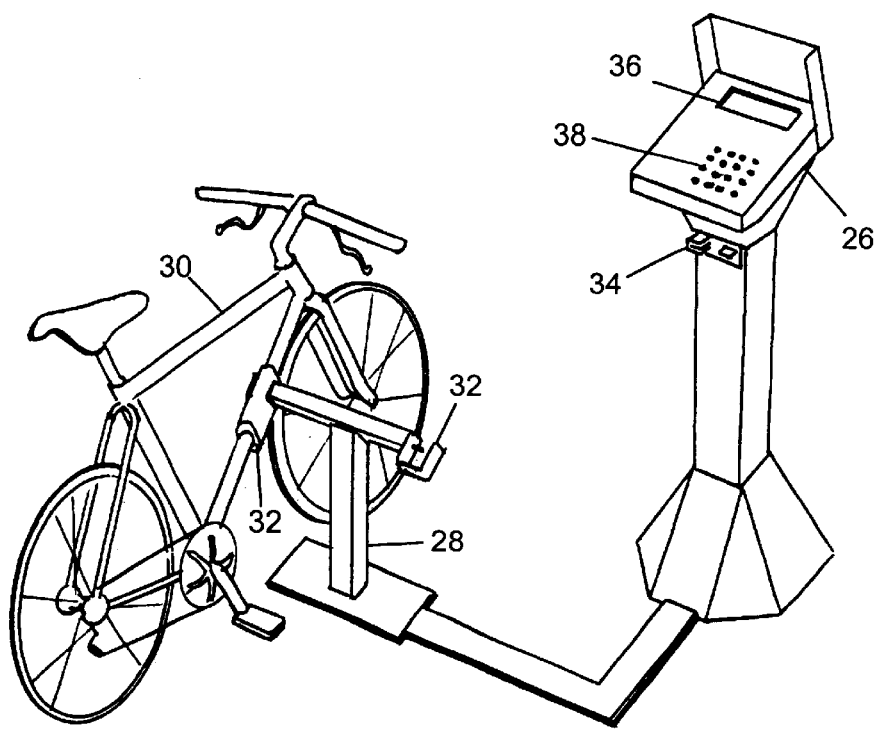
FIG. 2 is a plan view illustrating a bicycle secured to a security rack, which is connected to a control center.

FIG. 1 is a block diagram illustrating the control structure of a system controller 10 of the invention. Electrical power is supplied to the system controller 10 by a power supply 12 that may be of an AC or DC type and may incorporate a battery backup device. Input-output devices 14 are connected to the system controller 10 and include one or more control centers 26, which is depicted in FIG. 2, and may include a modem or other communication device to connect the system controller 10 to telephone systems and internet connections, a keyboard for entry of data or any other similar device. Unlocking devices 16 are under the direction of the system controller through control centers 26. An unlocking device 16 might comprise, an electromagnetic, solenoid operated or motor driven release closing mechanism. An alarm status output 18 is provided by the system controller 10 which may be connected to audio devices, visual devices, RF devices, telephonic devices or direct cable devices. One or more memory devices 20 are connected with system controller 10 for storage and retrieval of data utilized by the bicycle rental and security system. Such memory devices 20 may be comprised of any one or more types of volatile and non-volatile memory, including, ram, rom, flash ram, eprom, eeprom, magnetic tapes, floppy disks, hard disk drives and optical storage devices, such as, cdrom, CD-R, CD-RW and DVD. An alarm status input 22 is provided for input from one or more devices, which may comprise, electrically conductive material to complete a circuit, fiber optic material to conduct light, vibration sensors, motion sensors or the like. And an output 24 is provided by system controller 10, which may be connected to audio, video, or hard copy printing devices to indicate the current status or report recorded data from the bicycle rental and security system.

FIG. 2 is a plan view showing a control center 26 connected to a security rack 28, to which is secured a rental bicycle 30 by locking apparatus 32; control center 26 communicates with system controller 10 and rack 28. Incorporated within control center 26 is a card reader 34 which enables the control center 26 to accept and read cards, such as, credit cards, debit cards, pre paid rental cards and the like. Information read from a card by card reader 34 is transmitted by control center 26 to system controller 10. A display screen 36 may also be incorporated within control center 26 to provide display information, such as rental bicycle 30 availability information and customer record, credit and account information communicated from system controller 10. The display screen 36 of control center 26 may be touch sensitive so that input and selections may be made by tactile contact with the display screen, or a separate keypad 38 may be provided.

Figure 3:
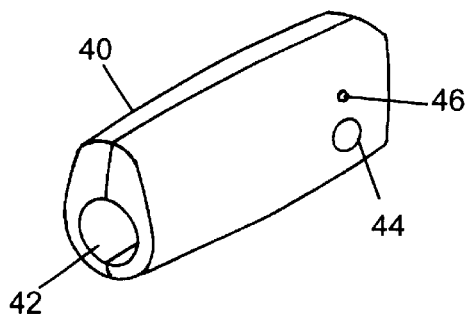
FIG. 3 illustrates a fastening module of the invention.

FIG. 3 is a illustration of a fastening module 40 formed with a mounting bore 42 through which fastening module 40 is mounted to a segment of the frame of rental bicycle 30. Also formed within fastening module 40 is a locking bore 44; and one or more first contacts 46 are arranged upon or formed in fastening module 40. Contained within fastening module 40 is an article identification means and mechanical shock sensor which are incorporated within a semiconductor circuit that is programmed with information which uniquely identifies the rental article to which it is attached, and programmed with a protocol for bi-directional communication with the control center 26. The semi conductor circuit contained within fastening module 40 is electrically connected to one or more first contacts 46. The shock sensor contained within fastening module 40 and incorporated within the semi conductor circuit, is of any known design, such as a piezio electric film, mercury sensor or a simple resilient spring mounted force sensitive switch which is mechanically maintained in its deflected position in the event of a mechanical force sufficient to deflect the resilient spring and open or close the switch.

Figure 4:
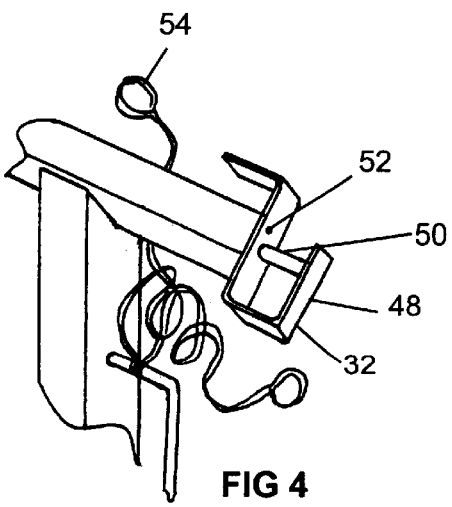
FIG. 4 illustrates a back side view of a locking apparatus of the invention.

FIG. 4 illustrates an enlarged back side view of the locking apparatus 32 which incorporates u-shaped member 48 and slideable locking pin 50, wherein the slideable locking pin 50 has a retracted and an extended position. Slideable locking pin 50 is located within unshaped member 48, such that when slideable locking pin 50 is in its retracted position, a fastening module 40 may be placed within u-shaped member 48. Upon placing a fastening module 40, of a rental bicycle 30, within u-shaped member 48, slideable locking pin 50 may be shifted to its extended position, whereby locking bore 44 is engaged by slideable locking pin 50 securing rental bicycle 30 to security rack 28.

Disposed within each u-shaped member 48 of locking apparatus 32 are one or more second contacts 52, which are electrically connected to the control center 26, and which correspond to the one or more first contacts 46 of fastening module 40. First contacts 46 and second contacts 52 are caused to come into alignment and electrical contact, when locking bore 44 is engaged by slideable locking pin 50, thereby allowing bi-directional communication between the semi conductor circuit of fastening module 40 and the control center 26 thus communicating the identification of rental bicycle 30 and the status of the shock sensor to the system controller 10 through control center 26. The system controller 10 is therefore able to perceive the location of each rental bicycle 30 when secured to a security rack 28 and whether the rental bicycle 30 has sustained an impact during its most recent rental period, and when it is removed from a security rack 28.

Also illustrated in FIG. 4 is an alarm cable 54, that may be provided for added security, containing electrically conductive material, such as disclosed in U.S. Pat. No. 4,920,334 to DeVolpi, that is connected to security rack 28 and may be woven through the wheels of rental bicycle 30 so that any unauthorized loss in the electrical continuity of alarm cable 54 is perceived by system controller 10, through alarm status input 22, to indicate possible theft of rental bicycle 30.

Figure 5:
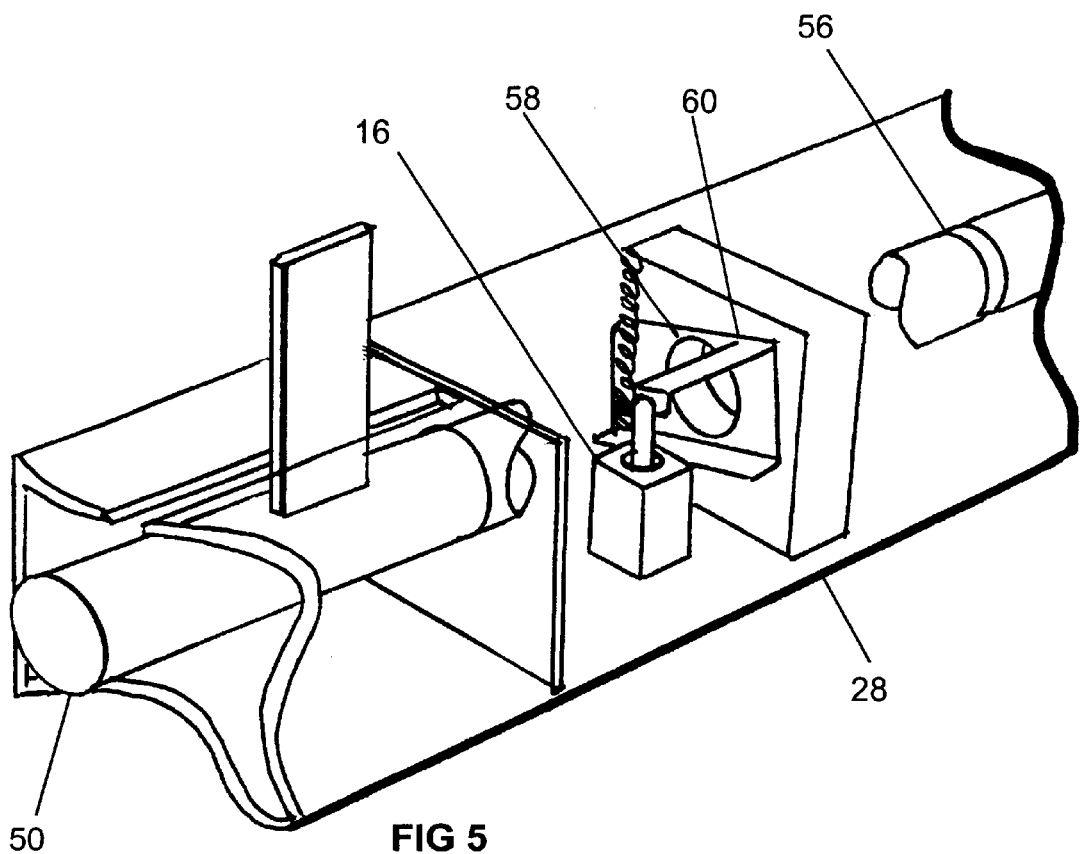
FIG. 5 is a cut away front side view illustrating the interior mechanism of a locking apparatus of the invention.

In FIG. 5 the interior components of the locking apparatus 32 are illustrated. Slideable locking pin 50, formed with a shoulder 56 about its circumference, passes through an aperture 58 and is capable of movement along its longitudinal axis from a retracted to an extended position. A key 60 is provided within locking apparatus 32 which is connected to an unlocking device 16, such as a solenoid, whereby operation of unlocking device 16 between its locked and unlocked position will cause key 60 to engage and disengage shoulder 56 when locking pin 50 is in its extended position, and thereby selectively secure locking pin 50 from movement along its longitudinal axis.

Figure 6:
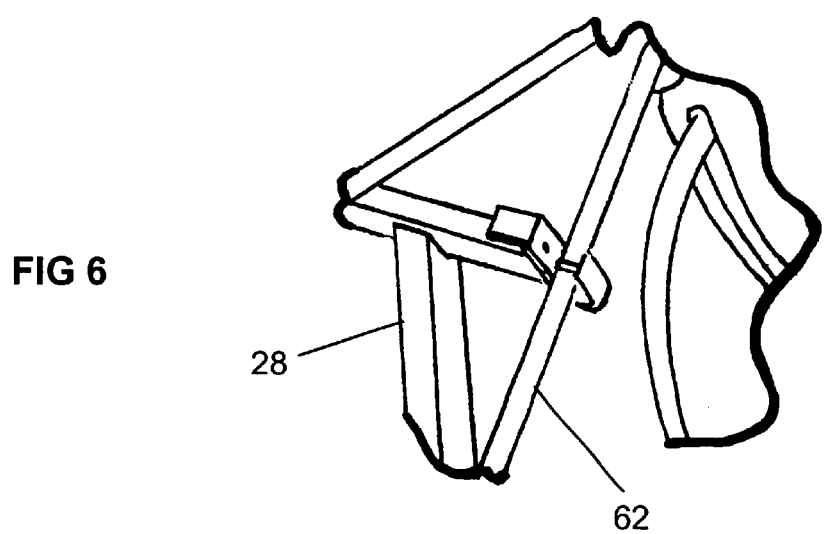
FIG. 6 illustrates a front side view of a locking apparatus of the invention, which is securing a bicycle without a fastening module.

FIG. 6 illustrates an instance in which a customer owned bicycle 62, without a fastening module 40, is secured to security rack 28 with locking pin 50 secured in its extended position. In operation as illustrated, a security only service may be provided using the same security rack 28 as utilized by the rental bicycles 30, since the system controller 10 can maintain location, customer and payment information in the absence of a fastening module 40, and the customer owned bicycle 62 may be secured with alarm cable 54, and by its frame with locking apparatus 32 in the absence of a fastening module 40.

Although the detailed description of the preferred embodiments is directed toward illustrating the above described embodiments, the present invention is not limited to such embodiments, as variations and modifications may be made without departing from the scope of the present invention as claimed herein.

What is claimed is:

1. A bicycle rental and security system comprising: one or more individually identifiable rental bicycles; a number of security racks with specific locations to place a rental bicycle; bi-directional communication means, capable of data verification, for signaling the individual identity of a rental bicycle and its presence when placed in a security rack, comprised of, a semi conductor circuit, which is attached to the rental bicycle and is programmed with data to individually identify the particular rental bicycle to which it is attached and the communication protocol to be utilized, having a link to a system controller, thereby establishing bi-directional communication between the semi conductor circuit and the system controller when a rental bicycle is present at the location on the security rack; customer input means for providing customer identification and payment information; and data memory means; wherein the system controller, monitors the bi-directional communication means for each rental bicycle, monitors the customer input means, and communicates with the data memory means for comparing changes in the presence and location of each rental bicycle and recording changes in the presence and location of each rental bicycle with corresponding customer identification and payment information.

2. A bicycle rental and security system as defined in claim 1 in which the link of the semi conductor circuit to the system controller comprises a first set of electrical contacts extending from the semi conductor circuit and a second set of corresponding electrical contacts positioned on the security rack and connected to the system controller which are arranged so that electrical contact is established between the first set of electrical contacts and the corresponding second set of electrical contacts when a rental bicycle is present at the location of the security rack.

3. A bicycle rental and security system as defined in claim 1 in which the link of the semi conductor circuit to the system controller comprises a first radio frequency transceiver electrically connected to the semi conductor circuit attached to the rental bicycle and a second radio frequency transceiver electrically connected to the system controller in sufficient proximity to the location on the security rack that bi-directional communication is established when the rental bicycle is within the location on the security rack.

4. A bicycle rental and security system as defined in claim 1 in which the link of the semi conductor circuit to the system controller comprises a first optical transceiver electrically connected to the semi conductor circuit attached to the rental bicycle and a second optical transceiver electrically connected to the system controller in sufficient proximity to the location on the security rack that bi-directional communication is established when the rental bicycle is within the location on the security rack.

5. A bicycle rental and security system as defined in claim 1, further comprising impact recording means, incorporated within the semi conductor circuit of the bi-directional communication means which communicates the status of the impact recording means when the rental bicycle is present at a location in a security rack.

6. A bicycle rental and security system according to claim 1 further comprising reservation input means, for selectable reserving a rental bicycle for the customer at a specific security rack location for a specified time period.

7. A bicycle rental and security system as defined in claim 1, further comprising, locking means for selectively releasing a rental bicycle from a security rack location, in response to a signal from the system controller.

8. A bicycle rental and security system as defined in claim 6, further comprising, locking means for selectively releasing a rental bicycle from a security rack location, in response to a signal from the system controller.

9. A bicycle rental and security system as defined in claim 1 wherein the bi-directional communication follows a changing encryption scheme for increased communication security.

10. A bicycle rental and security system as defined in claim 7, further comprising impact recording means, incorporated within the semi conductor circuit of the bi-directional communication means which communicates the status of the impact recording means when the rental bicycle is present at a location in a security rack.

11. A bicycle rental and security system as defined in claim 8, further comprising impact recording means, incorporated within the semi conductor circuit of the bi-directional communication means which communicates the status of the impact recording means when the rental bicycle is present at a location in a security rack.

12. A bicycle rental and security system as defined in claim 5 wherein the bi-directional communication follows a changing encryption scheme for increased communication security.

13. A bicycle rental and security system as defined in claim 10 wherein the bi-directional communication follows a changing encryption scheme for increased communication security.

14. A bicycle rental and security system comprising: one or more individually identifiable rental bicycles; a number of security racks with specific locations to place a rental bicycle; bi-directional communication means, capable of data verification, for signaling the individual identity of a rental bicycle and its presence when placed in a security rack, comprised of, a semi conductor circuit, which is attached to the rental bicycle and is programmed with data to individually identify the particular rental bicycle to which it is attached and the communication protocol to be utilized, having a link to a system controller, thereby establishing bi-directional communication between the semi conductor circuit and the system controller when a rental bicycle is present at the location on the security rack; and data memory means; wherein the system controller, monitors the bi-directional communication means for each rental bicycle, and communicates with the data memory means for comparing changes in the presence and location of each rental bicycle and recording changes in the presence and location of each rental bicycle, whereby the desirability of relocating one or more rental bicycles to different security rack locations may be ascertained.

* * * * *